(12) United States Patent
Bigelow

(10) Patent No.: US 6,293,500 B1
(45) Date of Patent: Sep. 25, 2001

(54) INTEGRATED TRANSLATION TUBE ASSEMBLY FOR A SPACE MODULE

(75) Inventor: Robert T. Bigelow, Las Vegas, NV (US)

(73) Assignee: Bigelow Development Aerospace Division, Limited Liability Company, Las Vegas, NV (US)

( * ) Notice: Subject to any disclaimer, the term of this patent is extended or adjusted under 35 U.S.C. 154(b) by 0 days.

(21) Appl. No.: 09/549,624

(22) Filed: Apr. 14, 2000

(51) Int. Cl.[7] ........................................................ B64G 1/10
(52) U.S. Cl. ........................................ 244/159; 244/158 R
(58) Field of Search .................................. 244/159, 158 R, 244/161

(56) References Cited

U.S. PATENT DOCUMENTS

| | | |
|---|---|---|
| 3,952,976 | * 4/1976 | Fletcher et al. . |
| 4,273,305 | * 6/1981 | Hinds . |
| 4,562,979 | * 1/1986 | Taylor . |
| 4,715,566 | * 12/1987 | Nobles . |
| 5,429,851 | 7/1995 | Sallee . |
| 5,441,221 | * 8/1995 | Wade et al. . |
| 5,806,799 | 9/1998 | Lounge . |
| 5,848,766 | 12/1998 | Thompson . |
| 6,149,104 | * 11/2000 | Soranno . |

OTHER PUBLICATIONS

NASA Facts, May 1999, "The TransHab Space Module; An Inflatable Home In Space", IS–1999–05–ISSo27JSC.

* cited by examiner

Primary Examiner—Charles T. Jordan
Assistant Examiner—Tim Dinh
(74) Attorney, Agent, or Firm—Skinner Sutton Watson & Rounds; John D. Long, Esq.

(57) ABSTRACT

The present invention provides an improved integrated translation tube for the movement of equipment and personnel through space modules, particularly for non-rigid type space modules such as the NASA Transhab module. In addition, the present invention provides an internal framework for the structural support of the space module itself, and the equipment installed internally to the space module. The present invention's arched shaped translation tube provides sufficient strength and rigidity to provide the required structural support, while simultaneously maximizing the uninterrupted interior volume of the space module.

23 Claims, 12 Drawing Sheets

INTEGRATED TRANSLATION TUBE ASSEMBLY FOR A SPACE MODULE

BACKGROUND OF THE INVENTION

1. Field of the Invention

The present invention relates to the field of translation tubes affixed to the interior of outer space orbiting structures and space vehicles, generally known as space modules or space stations. In particular, the present invention relates to the integration of these translation tubes into expandable and inflatable space modules, such as the NASA TransHab module.

2. Discussion of the Prior Art

The cost of launching heavy structural components into space to build space stations and space vehicles is prohibitive. Intense research and development efforts have been expended into the development of lightweight structural components for these applications. In particular, internally pressurized, non-rigid, fabric-like, expandable structures have been found to provide significant weight savings over traditional space structure components. One of the most recently developed of these non-traditional space structures is NASA's TransHab space module.

These inflatable space modules use fabric-like materials to create non-rigid walls that can expand when pressurized, or otherwise expanded, to form the space module's pressure boundary. Typical materials used to form the TransHab module's walls include Nomex, Kevlar, and a variety of other fabric or sheet materials. Sponge like materials, such as open cell elastomers, are layered between these sheets. These elastomeric layers are compressed prior to launch. Once in orbit, the elastomeric layers are allowed to expand, the module is pressurized, and the space module expands into its deployed configuration. The elastomeric layers act to form the walls of the module and also provide insulation. Other means and materials are also available to form these expandable space structures. The present invention is particularly useful for application to any type of expandable space module with non-rigid, non-load bearing, pressure boundary walls.

The soft, non-rigid structure of inflatable space modules makes it difficult to outfit their interior space with life support and scientific equipment. The non-rigid design lacks structural hard points to anchor equipment, floors, docking ports, hatches, etc. Although designed for ultimate use in near weightless conditions, there is a critical need for equipment anchorage points to support equipment under earth gravity, and especially during launch. It is also imperative that the space module has rigid structural mounting points to maintain the relative positioning of equipment and materials even after the module is in orbit.

Besides equipment load stresses, the space module must also withstand internal pressurization forces caused by the inflation and pressurization of the space module once it is deployed in orbit. These forces vary dependent on the design of the space module. However, it is generally desirable, if not imperative, to restrain the space module to prevent overstressing the module's walls.

The space module may also experience stresses because of externally applied loads. For example, whenever the space module docks with a space vehicle, or another space structure, significant stresses are created. During these docking maneuvers, the space module's lack of structural rigidity may allow the pressure boundary to deflect, and overstress the space module. The space module must be reinforced to prevent this deflection, and protect the integrity of the space module during docking.

All of the above-described stresses, both internal and external, require the integration of a rigid internal framework into the space module to resist these loads. The internal framework must be designed to withstand these loads, rather than stressing the space module's walls. The development of this internal framework is dictated by the construction method employed to construct these inflatable structures.

One of the simplest methods for constructing these non-rigid structures involves forming a generally cylindrically shaped space module. The space module's fabric walls are gathered together to enclose, and form a cylinder at two connection points. Current construction practices utilize an end ring at both ends of the cylinder to form these connections, and complete the space module's pressure boundary. These end rings provide structural hard points on which to construct a rigid internal framework. The internal framework of prior art designs uses a translation tube that extends coaxially through the center of the cylinder, as exemplified by the NASA Transhab module.

The centric translation tube, however, has significant functional and structural drawbacks. The centric translation tube design disrupts the interior spatial distribution of the module, preventing the module's interior space from being effectively utilize. Many space module applications require a much greater uninterrupted volumetric space than can be provided by the current centric translation tube design. These applications require the use of oversized manufacturing and scientific equipment that simply cannot fit inside a space module with the centric translation tube design. The size of the space module is constrained by the size of the launcher's cargo bay volume, which is extremely limited. Consequently, the space module simply cannot be scaled up in size, to avoid the inefficiency of the centric translation tube.

The centric translation tube is also much more difficult to load with equipment and material during prelaunch activities. The centric translation tube only provides limited access to the inside of the translation tube. Not only is the centric translation tube difficult to load, deploying equipment once loaded the module is in orbit. Limited space is available to create portals through which to drag equipment. As a result, oversized equipment cannot be redeployed from the centric translation tube, limiting the flexibility of the space module.

Another significant problem associated with the centric translation tube is the space module's diminished habitability and livability. The crew quarters are always in close proximity to the centric translation tube. As a result, crewmembers that are passing through the translation tube are much more likely to disturb others who are sleeping, or concentrating on their work. Vibrations created by crew and equipment transiting through the translation tube may also affect space module experiments. Many types of scientific equipment are extremely sensitive to vibration (e.g., cameras, telescopes, etc.). The conduct of the experiments themselves may also be vibration sensitive, and adversely affected.

Finally, none of the current state of the art translation tubes used for inflatable space modules utilizes a separately pressurizable translation tube. This presents the potential for tragic consequences in the event of a breach of the space module's pressure boundary, or some other catastrophic failure occurs.

An improved translation tube is necessary to solve these problems. The limitations imposed by the prior art severely limits the mission capabilities of current space modules, and significantly increases the cost of many other missions. The centric translation tube is inefficient, and prevents the full utilization of inflatable space modules.

SUMMARY OF THE INVENTION

It is desired to provide an improved translation tube, particularly for integration into non-rigid, expandable space modules. The primary objective of the present invention is to provide structural support to the space module, while simultaneously maximizing the uninterrupted volumetric space of the module. These are conflicting objectives because as the uninterrupted space increases, the structural support to the module decreases. However, the present invention has overcome this dichotomy, utilizing a translation tube that can be transformed into new structural configurations as the mission requires.

Consequently, it is the objective of the present invention to have the capability to convert the translation tube into an open volume, that connects with the main volume of the space module, to maximize the uninterrupted volume in the module.

It is further the objective of the present invention to have the capability to utilize floor panels (that are not needed during launch), as structural stiffeners to reinforce the translation tube during launch.

It is further the objective of the present invention to have the translation tube itself be geometrically transformable into floor panels (which can function as equipment mounting plates) that opens the space inside the translation tube into a larger, more useable work area, and to provide anchorage points for equipment.

It is further the objective of the present invention to simplify the pre-launch loading of equipment by creating a structurally stable, fully supported loading platform. This platform may be reinforced by floor panels attached to the translation tube to provide additional structural stiffening.

It is further the objective of the present invention to simplify the pre-launch equipment loading by attaching equipment to the translation tube side panel folding the side panel up into and inside the translation tube. Loading is also simplified through ease of access to the translation tube through the opening created by the side panel.

It is further the objective of the present invention to simplify the deployment of equipment from the translation tube into the space module once the module is in orbit. This objective is attained by propositioning the equipment on the side panel prior to launch, and once in orbit, simply lowering the side panel with the equipment attached. The deployment of any remaining equipment located inside the translation tube is facilitated because of the large opening created by the side panel.

It is further the objective of the present invention to isolate translation tube vibration, caused by material and crew transiting through the translation tube, from personnel and equipment operating inside the module.

It is further the objective of the present invention to create a pressurizable translation tube to act as a "lifeboat" in the event that there is a catastrophic failure or accident onboard the space module.

All of these objectives must be met while ensuring that the translation tube is adequately designed to support structural loads during pre-launch activities, and the launch itself. Once in space, the present invention must also withstand forces created by the module's internal pressurization, among other loads.

The present invention accomplishes all of these goals, and has other significant advantages over prior art translation tubes. These objectives and improvements are obtained with a unique arch shaped translation tube that can be utilized on any space module, and especially those with a generally cylindrical shape (the ends of the cylinder may be any shape, but generally are toroidal, ellipsoidal, flat or hemispherical). The present invention is particularly effective when integrated with non-rigid, expandable space modules because of its ability to perform different functional requirements, and provide different levels of structural support through the geometrical transformation of the translation tube. The translation tube is able to transform to the most optimal configuration to meet the functional requirements imposed during each phase of the space module's mission. This includes pre-launch, launch, and orbiting phases of the space module's mission.

The present invention has an offset housing that forms the principal corridor for transit through the module. The offset housing runs parallel to the principal axis of the cylindrical space module, along and closely spaced to the module's interior side wall.

The distal housings are centrally located in the end walls of the space module, and connect to the space module's inflatable walls to complete the module's pressure boundary. Connecting housings obliquely connect the offset housing to the distal housings. The connecting housings are used as a transit corridor from the main levels of the space module to the distal housings. Taken together, the connection of the distal, the connecting, and the offset housings forms a passage for the entire length of the space module.

The offset housing, connecting housings, and the distal housings may have any cross sectional shape desired, and the cross sectional areas may vary along the length of the housing. The present invention may be a single piece construction, formed from truss work, or formed from panels, among other construction techniques. In some embodiments, even floor gratings may be used to construct the translation tube. The present invention may have punched out sections to lighten the overall weight of the translation tube. Truss work may be added to improve the overall rigidity and strength of the translation tube. Conversely, the present invention may be solid to allow it to be pressurized. The translation tube may be constructed from any number of materials. However, for overall structural rigidity, strength, and minimum weight, aluminum and fiber reinforced composite materials are preferred.

One of the principal improvements and advantages of the arch like translation tube design is that it provides a maximum of uninterrupted volume within the space module. The present invention allows, in one preferred embodiment, the detachment of a side panel from the offset housing to maximize the continuous uninterrupted floor space available on the module. In this transformation, the offset housing side panel is opened up, and redeployed along the entire side length of the offset housing.

The present invention's ability to transform the translation tube into an alternate configuration allows tremendous flexibility to reconfigure the space modules volumetric space as needed, dependent on mission objectives and functional requirements. This flexibility is further enhanced by the capability to deploy the offset housing side panel to form the space module's floor. This efficiently uses limited resources that would otherwise be under utilized. The offset housing's transformation capabilities provides tremendous weight savings by redeploying the translation tube from a structural box beam (primarily designed to withstand launch loads), into a floor support and positioning system for equipment. In a weightless environment these panels may float. To maintain the relative positioning of the side panel and any attached floor panels (the panels) to the translation tube, a detent, or a series of detents, may be desirable.

The huge expanse created by lowering the offset housing side panel also allows the installation of oversized equipment for manufacturing processes, and for conducting scientific experiments that could not otherwise be accommodated in the same size space module with the centric translation tube. As a result, the present invention maximizes the mission capabilities of any space module, allowing equipment that cannot be currently accommodated using the centric translation tube, to be placed in orbit.

The present invention also provides significant structural improvements over the centric translation tube. One of the most significant structural improvements of the present invention is that it creates a loading platform onto which equipment can be loaded during pre-launch activities. With the offset housing side panel in its open position, equipment can be easily loaded into the translation tube. Alternately, or in addition to, the side panel itself can be loaded with equipment in its deployed (i.e., lowered) configuration. Once the equipment has been loaded, the side panel can be swung up, and locked into place with a fastener. This greatly simplifies the loading process and provides a stronger and more convenient pre-launch staging area.

Another structural advantage of the present invention is its capability to use floor panels that can be integrated with, and/or attached to the offset housing. The offset housing side panels, and any associated floor panels, are folded together at launch to form the box beam structure of the offset housing. Once the station is in orbit, the offset housing side panel may be unfolded around its pivot, along with any additional floor panels that may be attached. Additional floor panels may also be attached to the trunk housing and deployed once in orbit. The translation tube itself may be used as a flooring member, thereby reducing the weight of the structure by virtue of requiring fewer floor panels. Both the side panel and the floor panels may be connected together by pivots, and/or connected by pivots to the offset housing. The pivoting action of the panels allows the panels not only to be easily deployed, but also provides a structural link to the translation tube.

In a second preferred embodiment, the translation tube acts as a "life boat" in the event of a catastrophic event onboard the space module. The ability to use the translation tube as a lifeboat is a particularly important consideration if the space module is being used to perform hazardous manufacturing processes, or experiments. The translation tube in this second preferred embodiment can be hermetically sealed to isolate it from the space module. Pressurizable hatches are used to seal any portals in the translation tube, and pressurizable seals, such as hatches or end caps, are placed in the translation tube as necessary to perfect a hermetic seal from the space module and space itself. In this embodiment, the translation tube would have to be a solid component, preferably formed from lightweight composite materials. The materials selected may be specifically designed to be fire and/or impact resistant depending on the activities being performed on the module and the threat they present.

Because the translation tube extends almost the entire length of the space module, the crew has quick and easy access to the translation tube, and the safety it provides.

Once inside the translation tube, the crew has time to plan the evacuation of the space module. The pressurized hatch in the present invention's distal housing provides an efficient and safe passage for the crew to board rescue craft that later dock at the space module, or to board a pre-stationed spacecraft.

The present invention also provides significant improvement in the livability of the space module in two ways. First, the larger expanse of uninterrupted interior space relieves the feeling of claustrophobia that affects many people. Secondly, the location of the translation tube at the perimeter of the space module's cylindrical wall allows sleeping quarters and workstations to be placed in areas that are not in contact with the translation tube. As a result, crewmembers passing through the translation tube will not disturb those that are sleeping or working. Likewise, sources of vibration from the transfer of personnel and equipment through the translation tube are isolated by their remoteness, and are less likely to affect ongoing experiments or the measuring equipment itself.

In summary, the present invention because of it is transformable geometrical structure, can efficiently and effectively satisfy mission flight requirements while minimizing the weight of the structure, even while maximizing the uninterrupted volumetric spice aboard the space module. Furthermore, in certain embodiments the translation tube may act as a "lifeboat" for the crew in the event of a catastrophic failure aboard the space module. In short, the present invention enables non-rigid, expandable, or inflatable, space module technology to be fully utilized by allowing missions that cannot be accommodated by the current state of the art, to be accomplished using the present invention.

DETAILED DESCRIPTION OF THE PREFERRED EMBODIMENTS

Preferred embodiments of the present invention that illustrate two best modes that are now contemplated for placing the invention in practice are described as follows, and in conjunction with the attached drawings that form a part of this specification. The preferred embodiments are described in detail without attempting to show all of the various forms and modifications in which the present invention may be embodied. The preferred embodiments described are illustrative, and as will become apparent to those skilled in the arts, can be modified in numerous ways within the spirit and scope of the invention, the invention being measured by the appended claims and not by the details of the specification.

Figure 1:
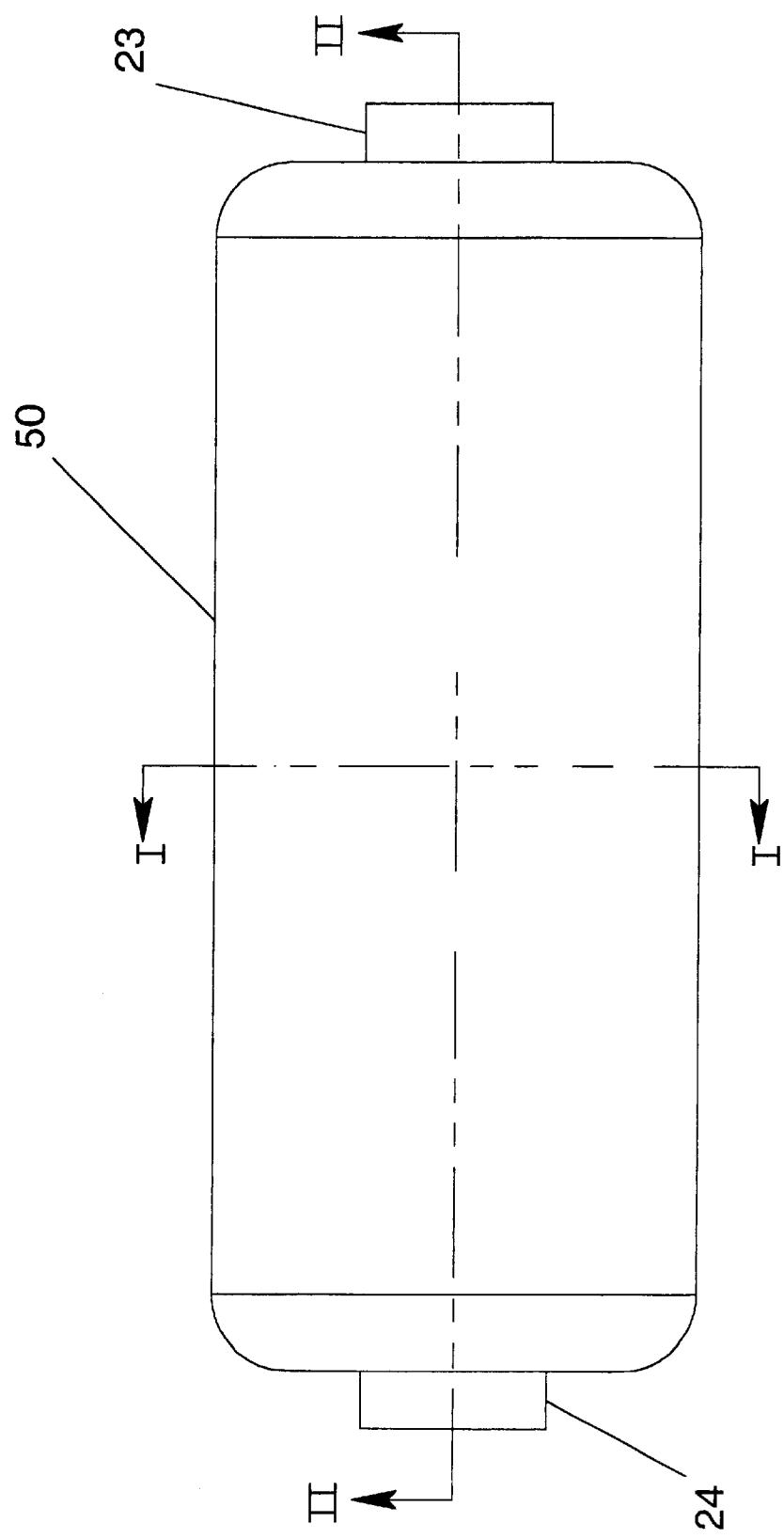
FIG. 1 is a side view of a typical expandable cylindrical space module.
Figure 2:
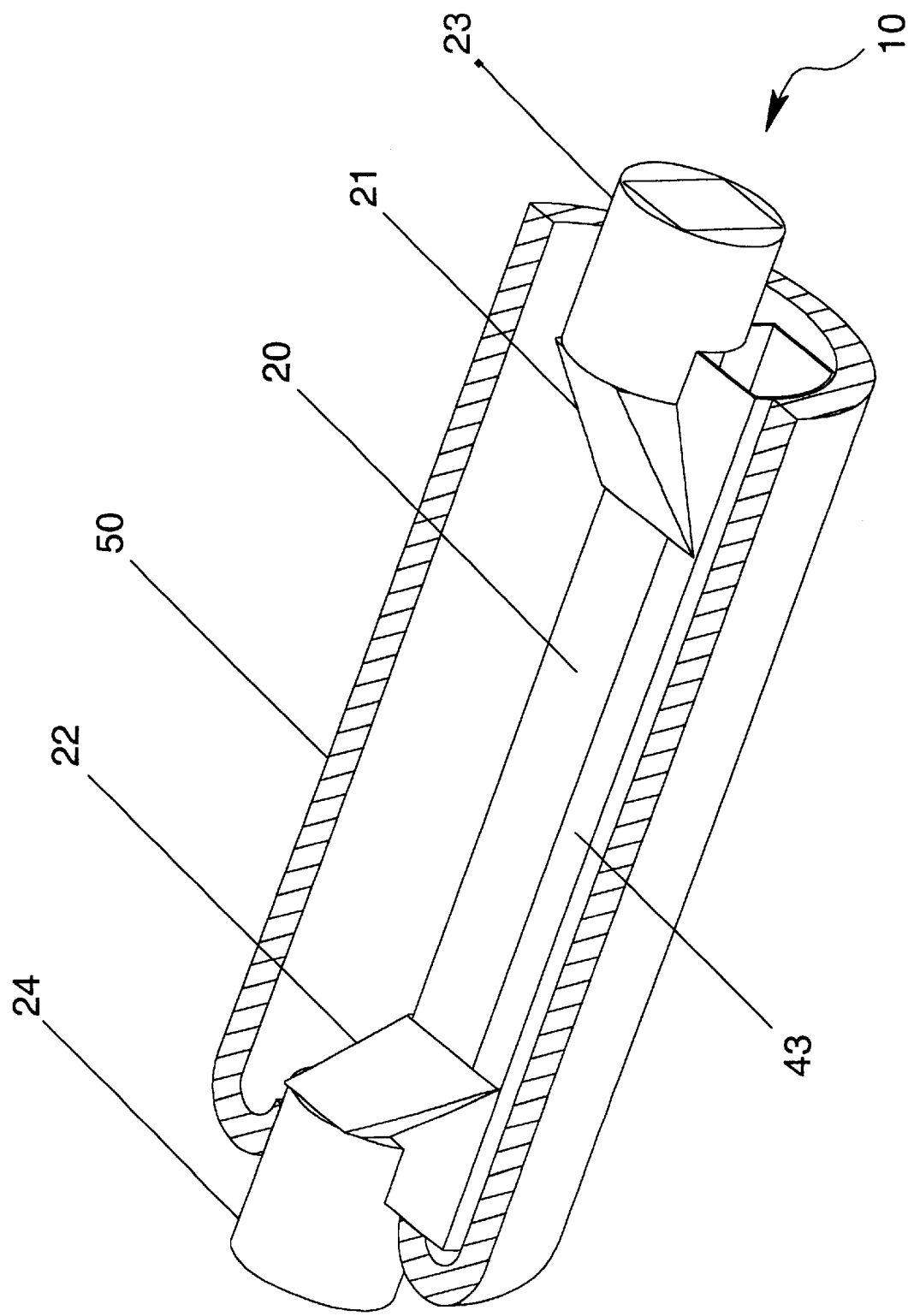
FIG. 2 is a cut away view of the space module with the translation tube in perspective.

The preferred embodiments of the present invention are particularly well adapted for use in a typical inflatable space module 50 as shown in FIG. 1 and FIG. 2. The first preferred embodiment of the present invention is illustrated in FIG. 2. FIG. 2 is a cut away view of the space module 50 showing the translation tube 10 in perspective connected inside the space module 50. The space module 50, once inflated, forms a non-structural hollow envelope. The translation tube 10 is integrated with the inflatable module to provide the structural support necessary to mount equipment to the module's interior.

Figure 10:
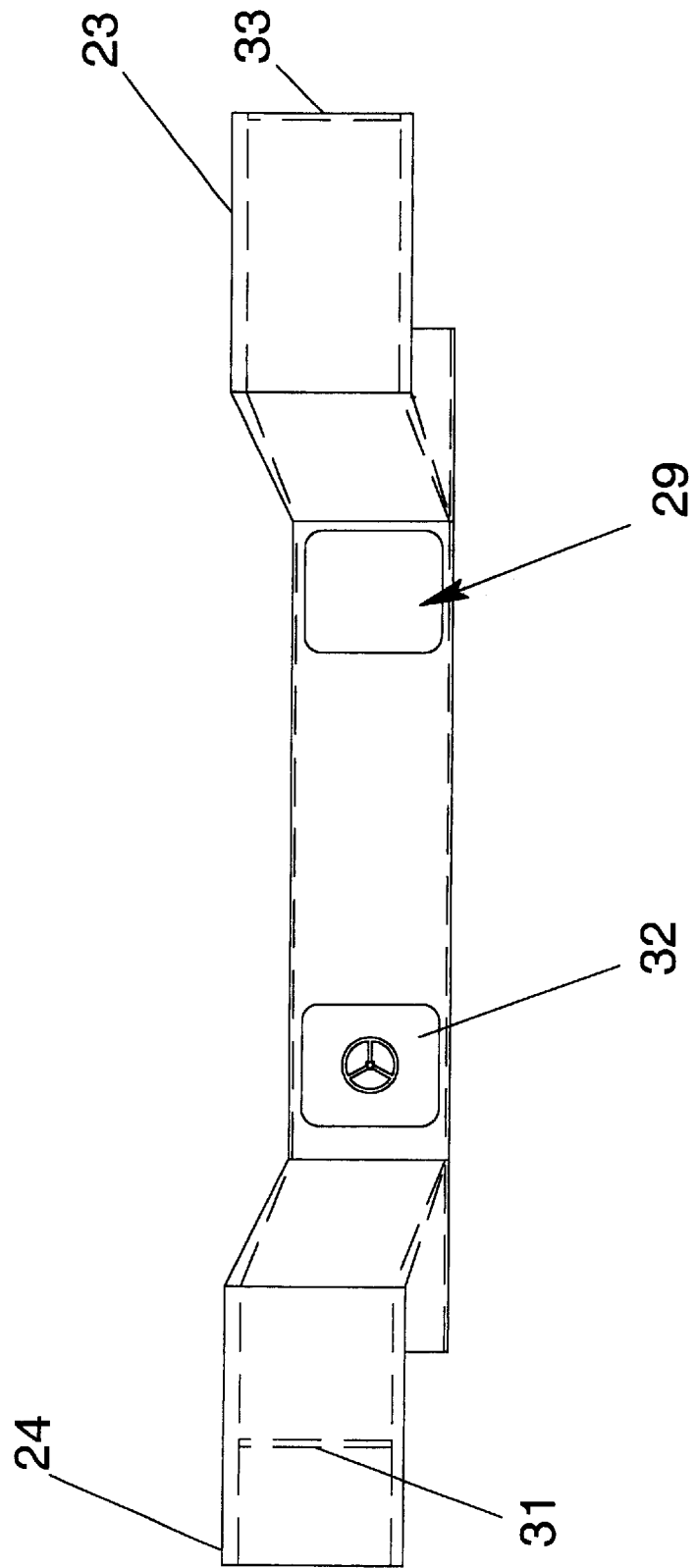
FIG. 10 is the second preferred embodiment depicting a cross sectional view II—II of the space module and the translation tube with a portal and a portal hatch.

Also visible in FIG. 1 and FIG. 2 are the right and left distal housings 23, 24 respectively, to which the non-rigid space module walls are connected at both ends of the cylinder. The distal housings 23, 24 may be designed in several different configurations dependent on the mode of operation intended for the space module. For example, the distal housing may be left open for connection to other space structures and space modules. Alternately, the distal housing assemblies may include a pressurizable hatch for use with another structure, a space vehicle, or which may be used for extra vehicular activities. Finally, the distal housing may be hermetically sealed with an end cap 33. A distal housing configuration is shown in FIG. 10.

Figure 6:
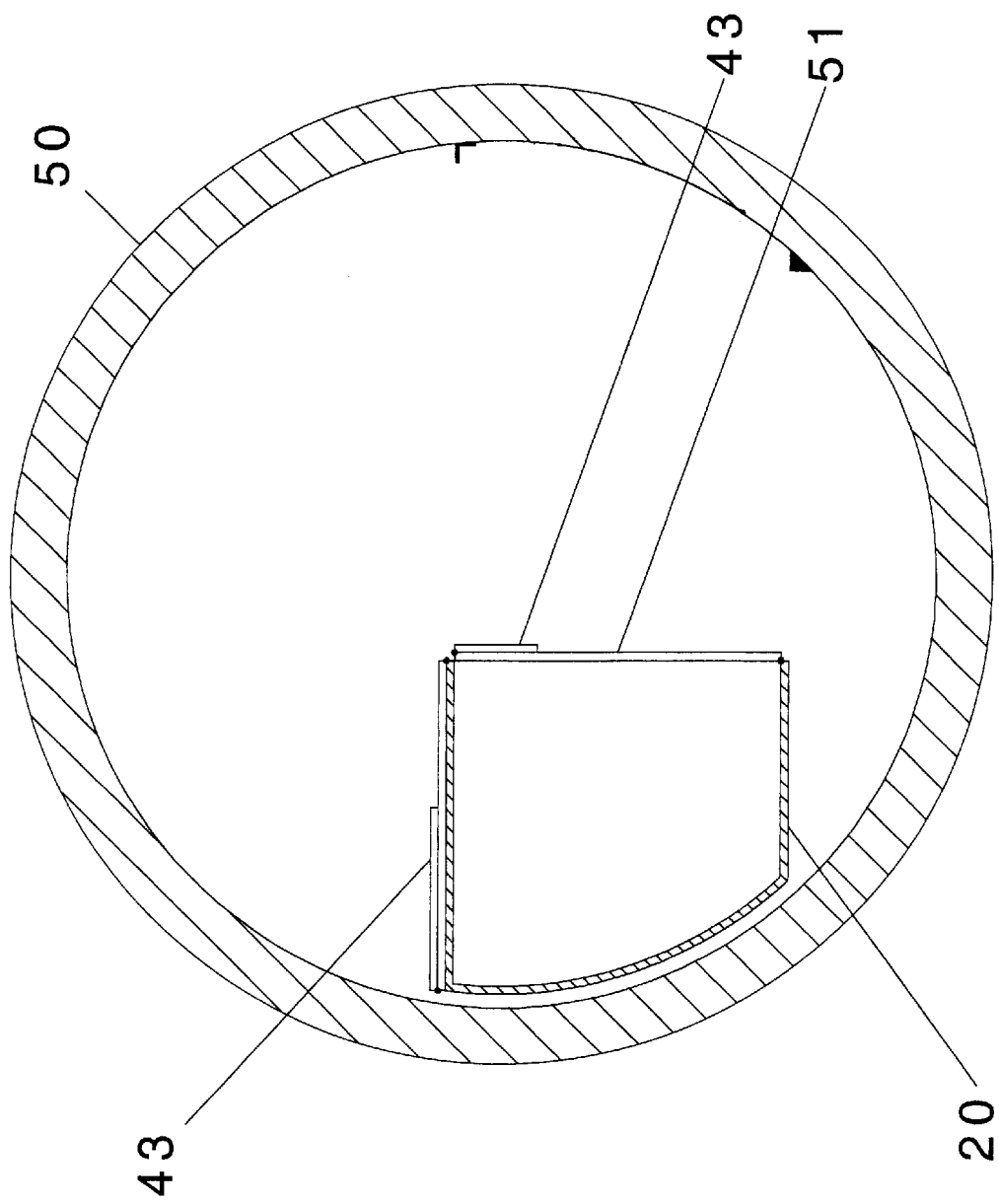
FIG. 6 is a cross sectional view I—I of the space module showing the translation tube side panels and floor panels in the undeployed position (i.e., launch position).
Figure 7:
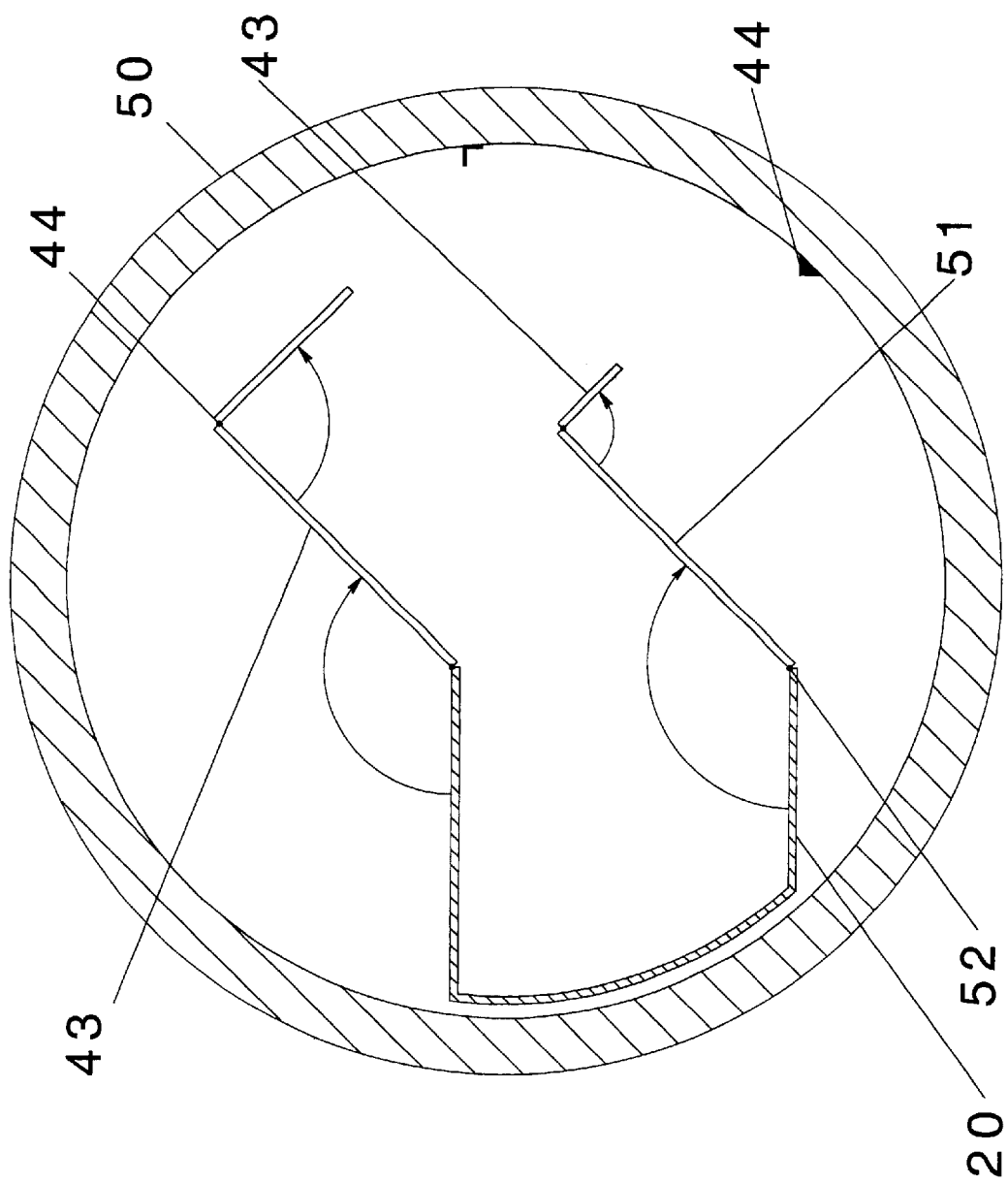
FIG. 7 is a cross sectional view I—I of the space module showing the translation tube side panels and floor panels in the process of being deployed.

FIG. 2 depicts the offset housing 20 which runs along and adjacent to the space module side wall. The outer wall of the trunk section may be curved to fit the interior wall of the space module to maximize useable space as shown in FIG. 6 and FIG. 7. The connecting housings 21,22 shift the ends of the translation tube back to the space module's principal axis to connect to their respective distal housings. The connecting housings are oblique to the space module's principal axis and the offset housing 20 as shown in FIG. 2. The upper and lower connecting housings may be identical. One end of the connecting housing merges with the distal housing. The other end of the connecting housing merges with the offset housing 20. The translation tube 10 is formed by connecting the right and left connecting housings 21, 22 to the respective right and left ends of the offset housing 20. The right and left distal housings 23, 24 respectively are connected to the right and left connecting housings 21, 22.

Figure 3:
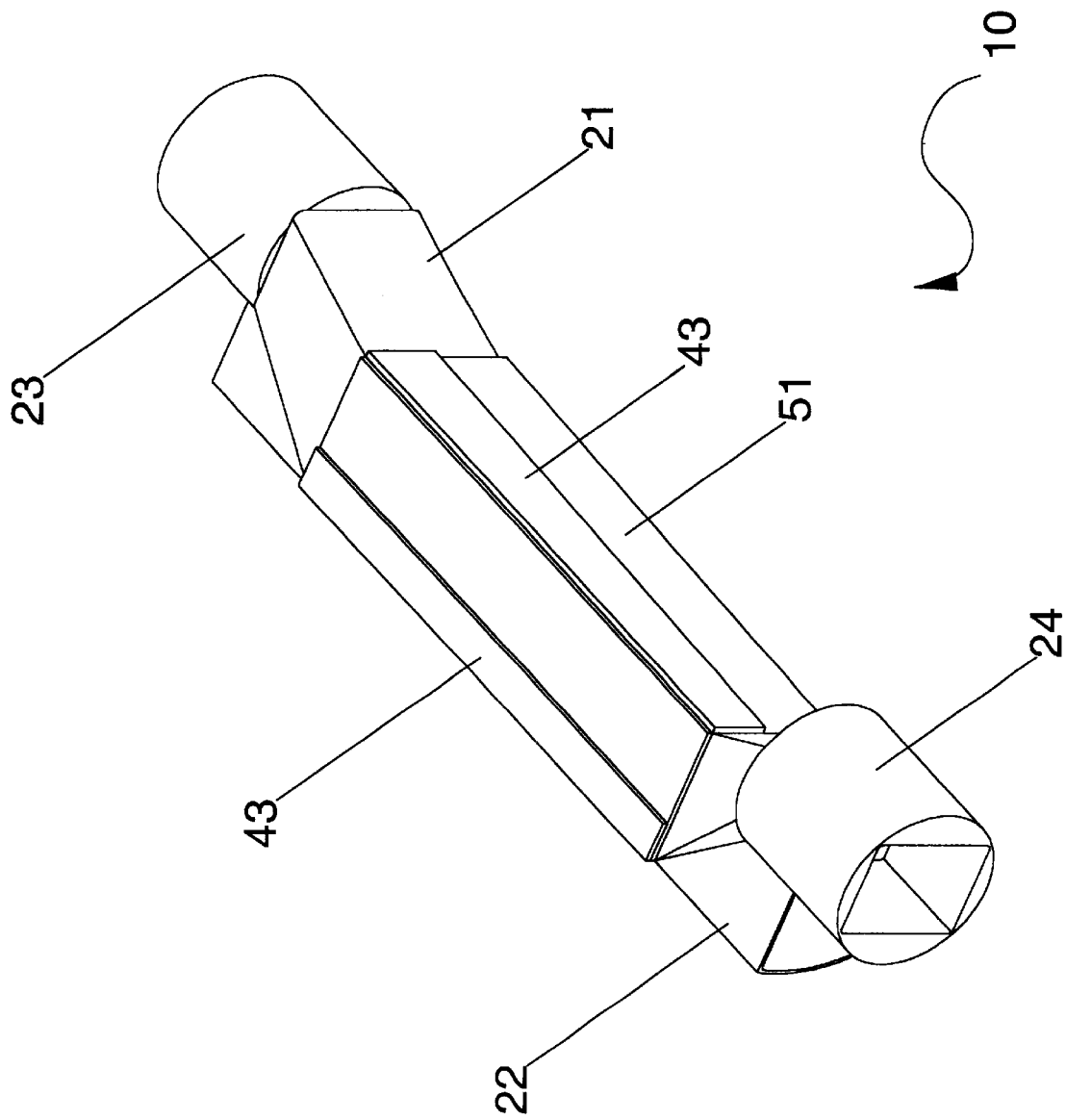
FIG. 3 is the translation tube in perspective with the side panels and floor panels in the undeployed position (i.e., launch position)

In the first preferred embodiment of the present invention, the offset housing is constructed with a side panel 51 as shown in FIG. 3. Prior to launch, side panel 51 is connected together to close off and form the offset housing, now acting essentially as a rigid box beam structure. This box beam structure is an extremely efficient design, capable of withstanding the launch forces imposed on the space module, and particularly the loading forces caused by the equipment mounted inside the translation tube.

Floor panels 43 may be connected to the offset housing for pivotal deployment once in orbit. FIG. 3 shows a folded floor panel 43 ready for deployment from the offset housing. These floor panels may be connected to the offset housing 20 and used to further reinforce the box beam structure. This structural strength is imperative because during launch, the weight of the equipment, and the translation tube itself, is four to five times the weight of gravity and impose significant loading stresses on the translation tube. These floor panels lend additional structural strength to the translation tube during launch, yet can be later deployed as flooring panels once in orbit.

Figure 4:
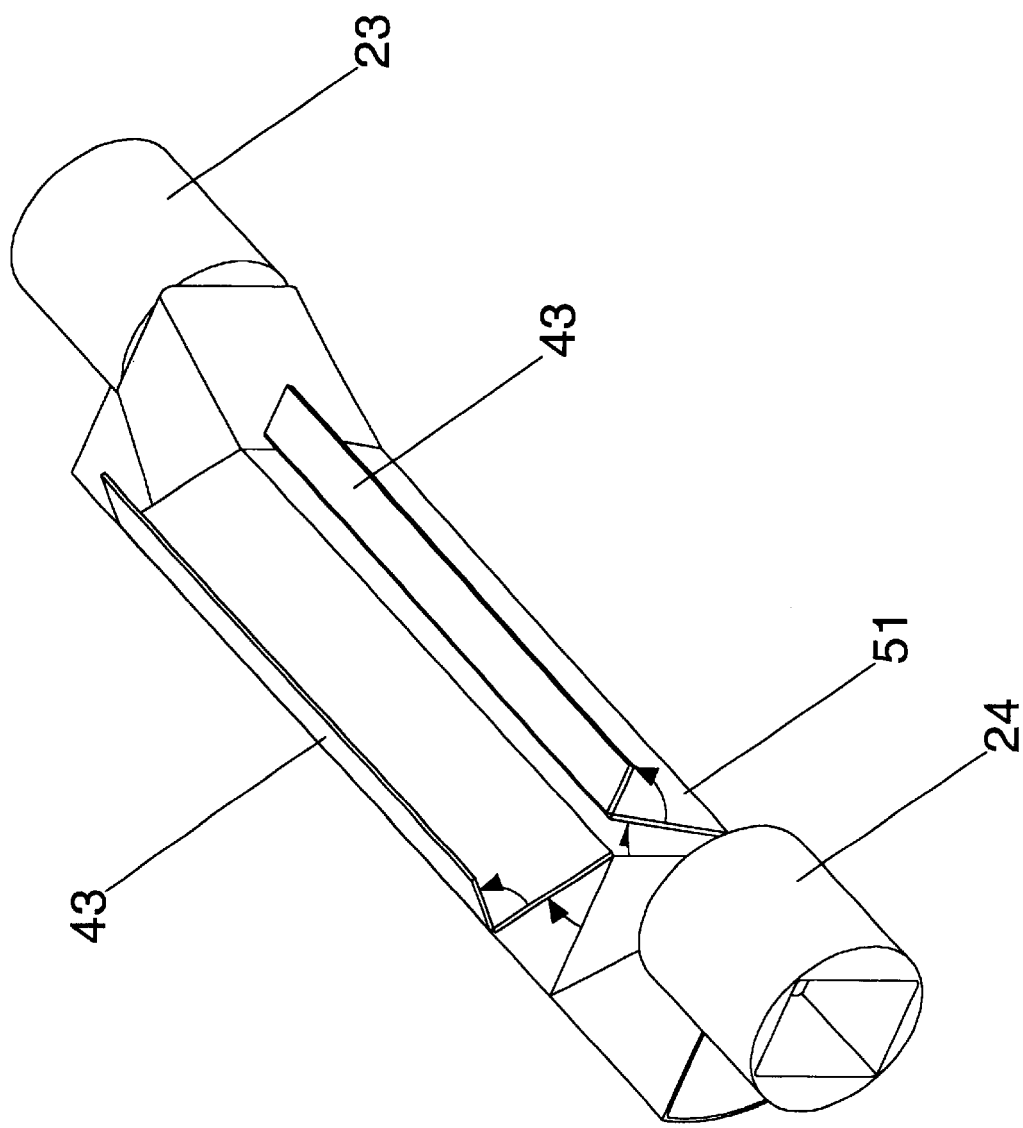
FIG. 4 is the translation tube in perspective with the side panels and floor panels in the process of being deployed.
Figure 5:
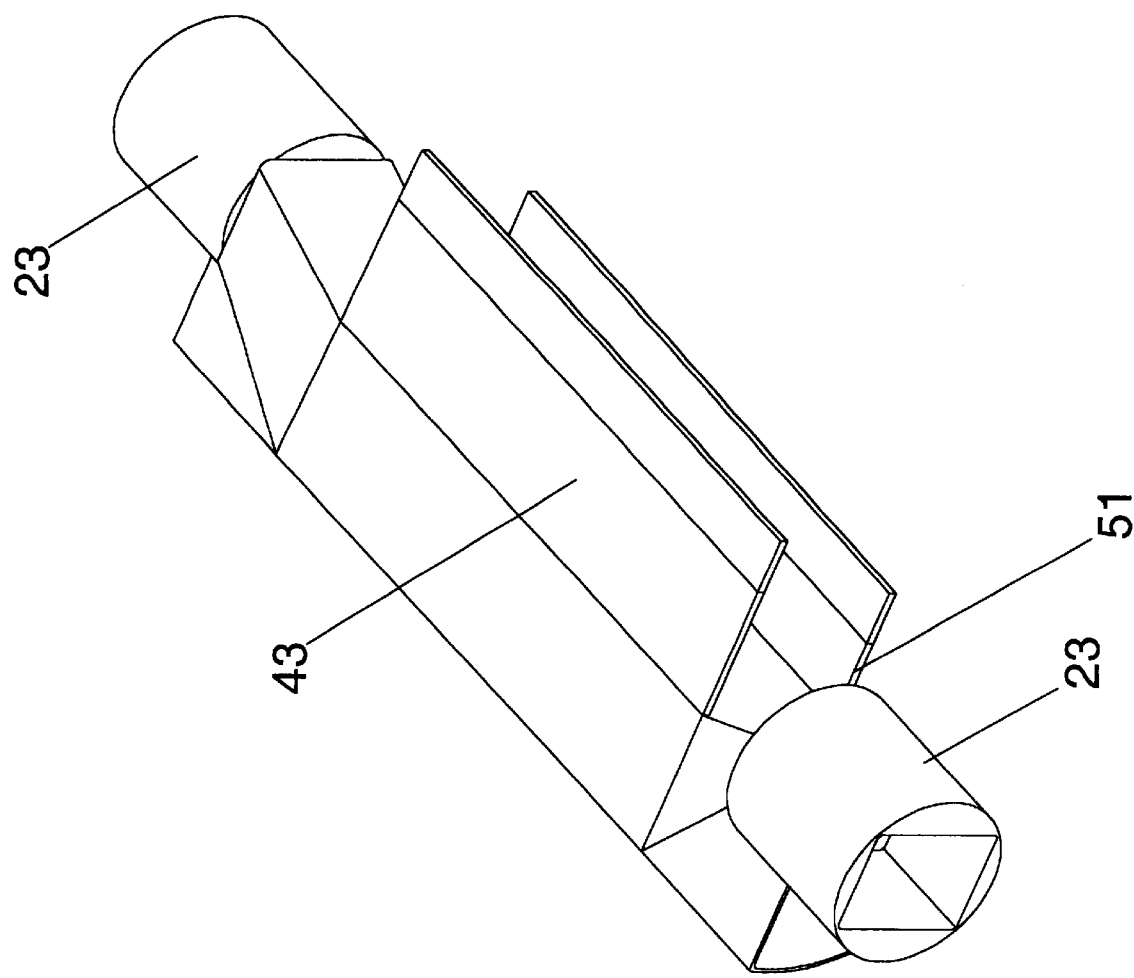
FIG. 5 is the translation tube in perspective with the side panels and floor panels in the deployed position (i.e., orbital position)

In orbit, the side panel 51, forming part of the offset housing's walls, is pivoted out to form, and function as a floor panel/mounting plate. FIG. 4 shows offset housing side panel 51 and floor panel 43 as they are being deploying from the offset housing. As shown in FIG. 5, once the side panel is deployed, the translation tube's offset housing is converted to useable floor space, as it opens onto the main floor space of the space module.

The side panel and the floor panels may be locked into place using a detent so that the panels do not float once in orbit. The detents may be used between the panels and the translation tube, or between the panels themselves. The first detent 52 locks the position of the side panel and prevents relative motion between the side panel and the offset housing. The second detent 44, locks the position of the floor panel 43 and prevents relative motion between the floor panel and the offset housing. In this manner, the translation tube requires no support or other connections to the non-rigid walls of the space module. Alternatively, detents can be installed on the space module wall to catch the panels and lock them into place.

Figure 8:
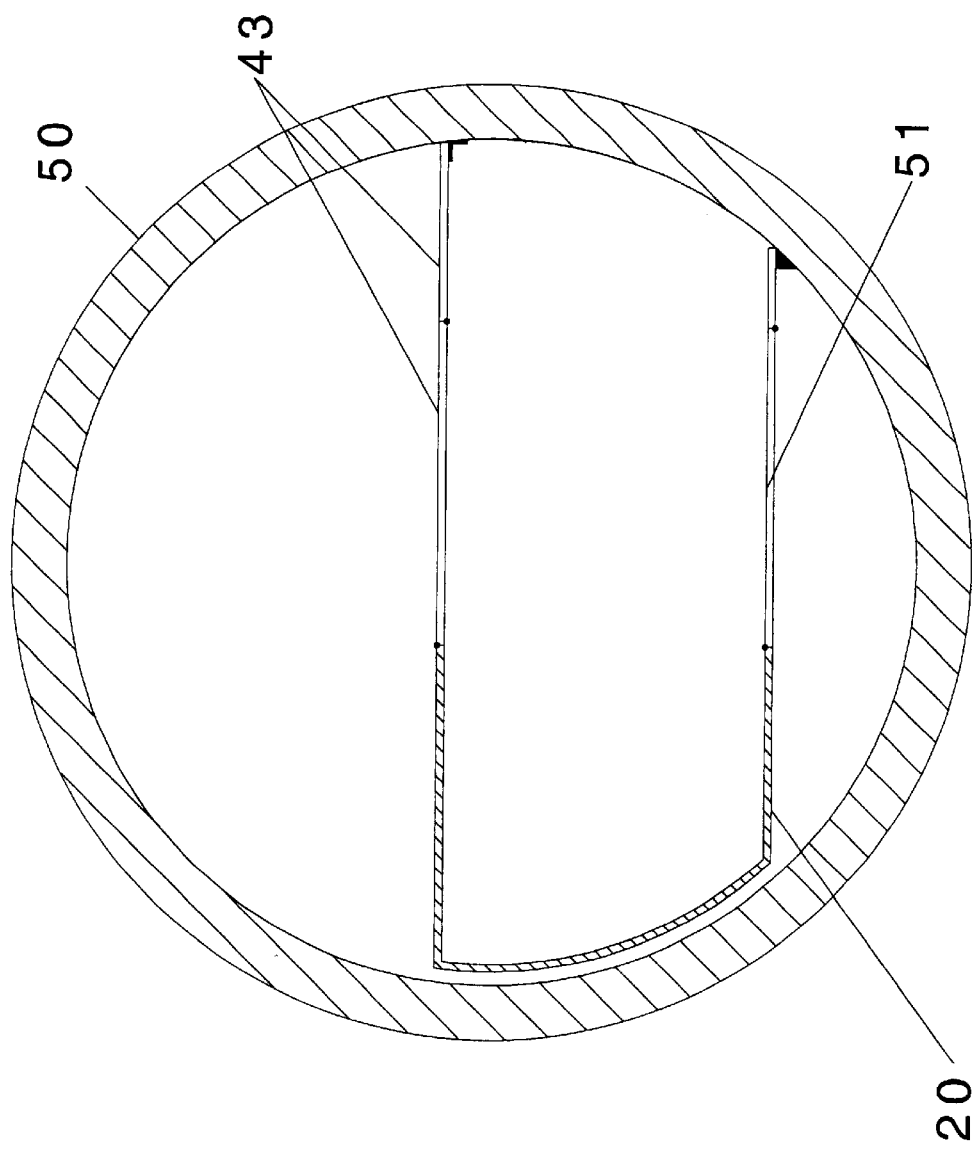
FIG. 8 is a cross sectional view I—I of the space module showing the translation tube side panels and floor panels in the deployed position (i.e., orbital position)
Figure 9:
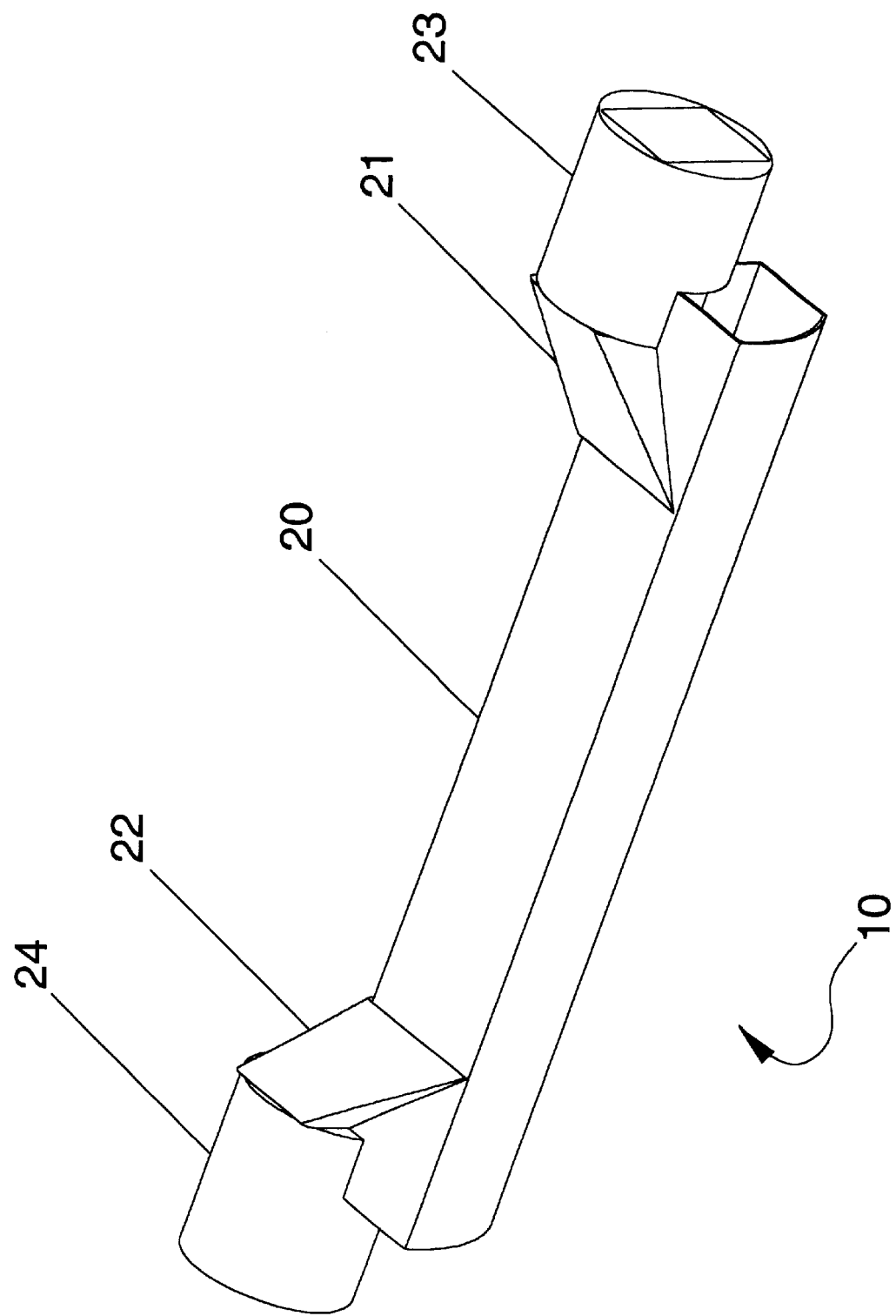
FIG. 9 is the second preferred embodiment showing the translation tube in perspective without side panels.

FIG. 6, FIG. 7, and FIG. 8 all show a cross sectional view of the space module demonstrating the deployment of the offset housing side wall and floor panels. In these cross sectional views it becomes apparent that the deployment of the translation tube significantly increases the module's uninterrupted floor space. In addition, equipment that was originally stowed within, and mounted to the translation tube for launch, can be easily redeployed and mounted in its designated locations once the offset housing side panel is deployed. In fact, the equipment mounted on the side panel may not require relocation, except for the pivoting down of the side panel. In this way the offset housing, which is necessary for structural and equipment load support during launch, but which becomes virtually obsolete once in orbit, is transformed into critical structural components once in orbit. This transformation saves substantial launch weight, which is critical to the mission and its commercial success.

Despite the offset housing's redeployment in orbit, the translation tube still provides the full structural support required by the space module. All of the loads, interior and exterior, imposed on the space module are still supported by the translation tube in its fully deployed position. The C channel formed by the deployment of the side panel (as shown in FIGS. 5, 6, and 7) links the floors and maintains their separation in weightlessness with the support of the detents. Axial loads are distributed by the C channel through the connecting housings and distal housings. Once in orbit, the absence of gravity makes the cantilevered floor panels a practical reality. The offset housing may be outfitted with portals 29 as necessary to access different levels of the space module. The portals 29 may have a pressurizable seal, such as a hatch 31 that can open or close off the translation tube from the space module. These hatches may be used to provide additional structural support to the translation tube at the portals, as well as security and privacy to specific areas of the space module.

Figure 11:
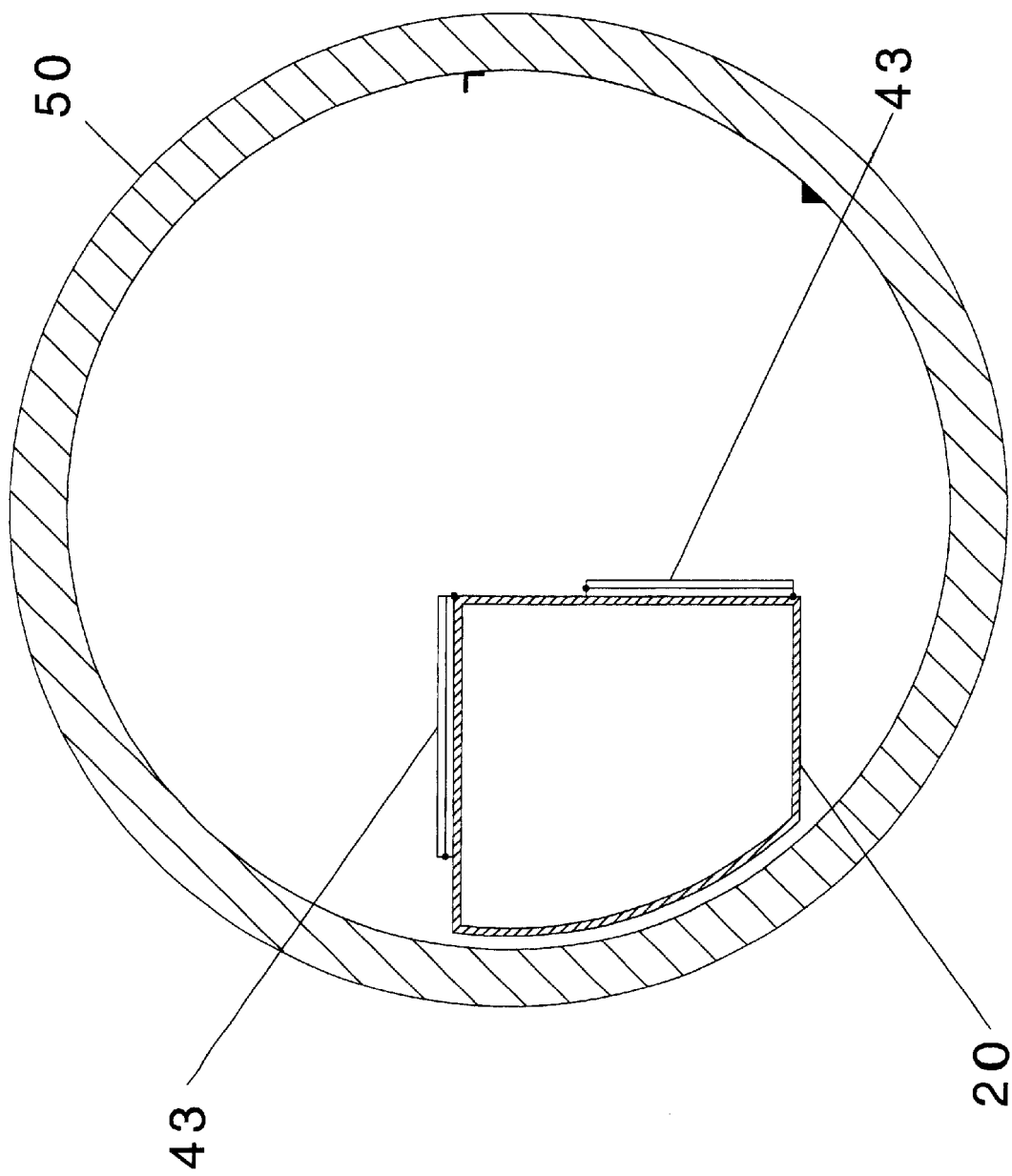
FIG. 11 is the second preferred embodiment depicting a cross sectional view I—I of the space module showing the translation tube with retracted floor panels.
Figure 12:
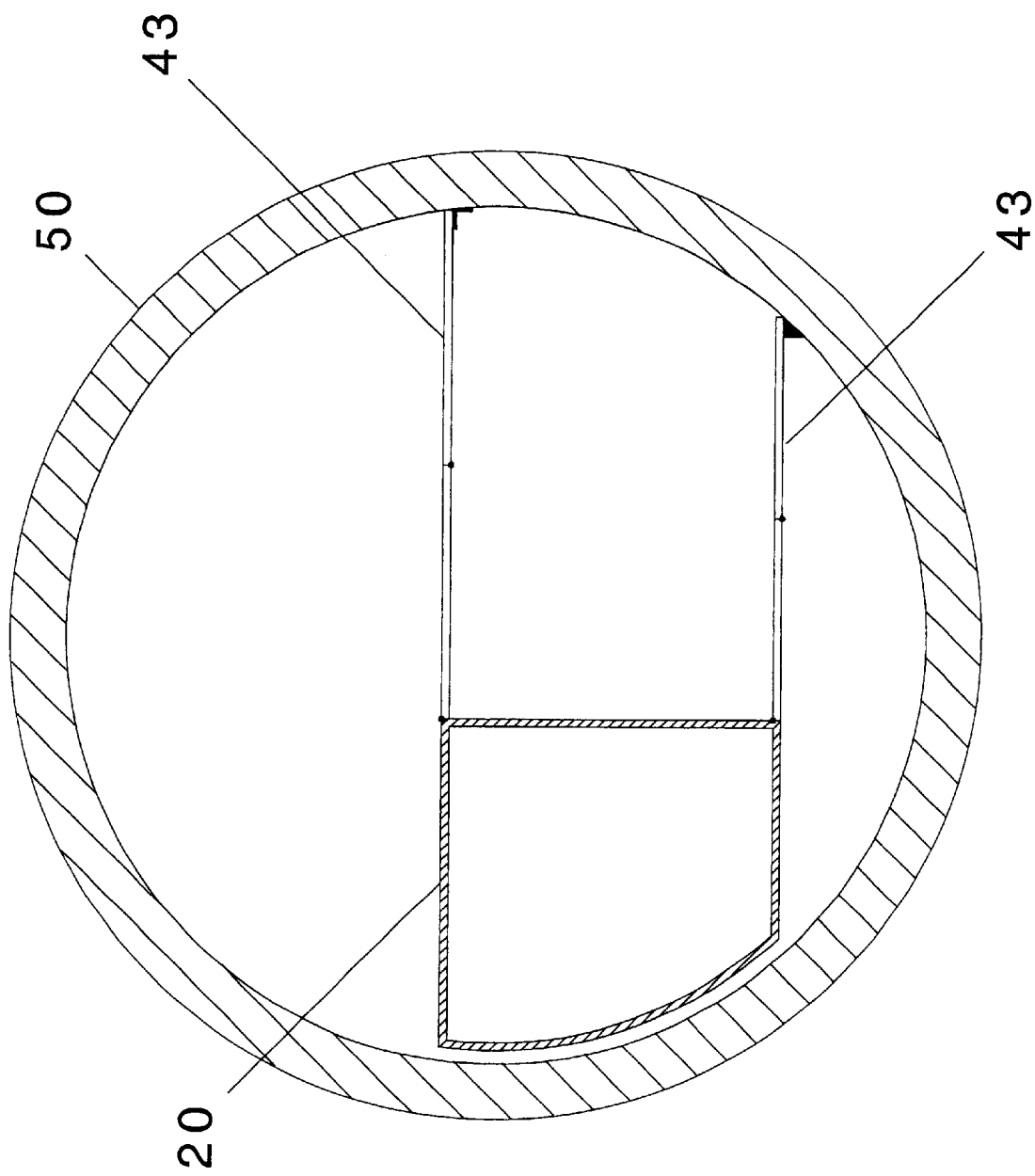
FIG. 12 is the second preferred embodiment depicting a cross sectional view I—I of the space module showing the translation tube with extended floor panels.

In a second preferred embodiment, as depicted in FIG. 10, with pressurizable hatches in the distal housings and pressurizable hatches sealing the offset housing portals, the translation tube can be turned into a "lifeboat" in the event of an accident. Although the uninterrupted floor space is not as great in comparison to the previous embodiment, the uninterrupted volumetric space within the module is still much greater than can be achieved with the centric translation tube. FIG. 11 and FIG. 12 depict a cross sectional view of the space module with the floor panels in the folded position, and subsequently in the fully deployed position.

The present invention may be integrated for use in space modules that may be self-contained entities, such as a space vehicle, space station, or satellite. Alternately, the present invention may be integrated with other space modules that may be connected together, or with other space structures to form a larger entity. As such, a space module may or may not require pressurized hatches, nor hermetically sealed end caps dependent on the space module's application.

The present invention has been described above with reference to certain preferred embodiments. It is understood that modifications and variations are possible within the scope of the appended claims that follow.

I claim:

1. An integrated translation tube, for use in a space module having two end walls connected by a side wall comprising:
   a. a left distal housing having a passage therethrough, said distal housing connected to the space module left end wall;
   b. a right distal housing having a passage therethrough, said right distal housing connected to the space module right end wall, said right distal housing substantially opposite to said left distal housing;
   c. an offset housing having a passage therethrough, said offset housing extending substantially between the left end and right end of the space module, said offset housing interior to, and closely spaced to the space module side wall;
   d. a left connecting housing having a passage therethrough, said left connecting housing obliquely connecting said offset housing and said left distal housing to form a passage therethrough; and
   e. a right connecting housing having a passage therethrough, said right connecting housing obliquely connecting said offset housing and said right distal housing to form a passage therethrough.

2. An integrated translation tube as described in claim 1 wherein said offset housing has a portal.

3. An integrated translation tube as described in claim 2 further comprising a pressurizable hatch, said pressurizable hatch connected to said offset housing to selectively seal said portal.

4. An integrated translation tube as described in claim 3 further comprising a floor panel, said floor panel connected to said offset housing, and a detent, said detent to lock said floor panel in a predetermined position.

5. An integrated translation tube as described in claim 4, further comprising at least two pressurizable seals, said pressurizable seals affixed to said right and said left distal housings to hermetically seal the passage.

6. An integrated translation tube as described in claim 1 wherein said offset housing has at least one side panel, said side panel selectively detachable from at least one edge of said offset housing to form an opening in said offset housing.

7. An integrated translation tube as described in claim 6 further comprising a first detent, said first detent to lock said side panel in a predetermined position.

8. An integrated translation tube as described in claim 7, wherein said left distal housing further contains a pressurizable seal.

9. An integrated translation tube as described in claim 7, further comprising at least two pressurizable seals, said pressurizable seals affixed to said right and said left distal housings to hermetically seal the passage.

10. An integrated translation tube as described in claim 7 further comprising:
    a. a floor panel, said floor panel connected to said side panel, and
    b. a second detent, said second detent to lock said floor panel in a predetermined position.

11. An integrated translation tube as described in claim 10 wherein said second detent is connected to said space module.

12. An integrated translation tube, for use in a substantially cylindrical shaped, space module comprising:
    a. an offset housing having a passage therethrough, said offset housing having a left end and a right end, said offset housing extending substantially the principal axial length of the space module, said offset housing interior to and offset from the space module's principal axis;
    b. a left distal housing having a passage therethrough, said left distal housing connected at the left end of the space module and located substantially coaxially with the space module;
    c. a right distal housing having a passage therethrough, said right distal housing connected at the right end of the space module and located substantially coaxially with the space module;
    d. a left connecting housing having a passage therethrough, said left connecting housing obliquely connecting said offset housing and said left distal housing to form a passage therethrough; and
    e. a right connecting housing having a passage therethrough, said right connecting housing obliquely connecting said offset housing and said right distal housing to form a passage therethrough.

13. An integrated translation tube as described in claim 12 wherein said offset housing has a portal.

14. An integrated translation tube as described in claim 13 further comprising a pressurizable hatch connected to said offset housing to hermetically seal said portal.

15. An integrated translation tube as described in claim 14, wherein each said left and right distal housings contains a pressurizable seal.

16. An integrated translation tube as described in claim 12 wherein said offset housing has at least one side panel, said side panel is selectively detachable from at least one edge of said offset housing to form an opening to the offset housing.

17. An integrated translation tube as described in claim 16 further comprising a first detent, said first detent to lock said side panel in a predetermined position.

18. An integrated translation tube as described in claim 17 further comprising;
    a. a floor panel, said floor panel connected to said side panel, and
    b. a second detent, said second detent to lock said side panel in a predetermined position.

19. An integrated translation tube as described in claim 18, further comprising a pressurizable seal, said pressurizable seal attached to said left distal member.

20. A translation tube comprising:
    a. a space module having a left and a right end wall connected by a side wall;

b. a left distal housing having a passage therethrough, said left distal housing connected to said space module left end wall;

c. a right distal housing having a passage therethrough, said right distal housing connected to said space module right end wall, said right distal housing substantially opposite to said left distal housing;

d. an offset housing having a passage therethrough, said offset housing having an arch like shape, said offset housing extending substantially between the left and right end of the space module, said offset housing connecting said left and said right distal housings to form a passageway therethrough, wherein said offset housing has a side panel, said side panel is selectively detachable from at least one edge of said offset housing to create an opening in the offset housing; and e. a first detent, said first detent locking said side panel in a predetermined position.

21. An integrated translation tube as described in claim 20 further comprising;

c. a floor panel, said floor panel connected to said side panel, and d. a second detent, said second detent to lock said side panel in a predetermined position.

22. An integrated translation tube as described in claim 21, further comprising a pressurizable seal, said pressurizable seal attached to said left distal housing.

23. An integrated translation tube as described in claim 21, wherein said left and said right distal housing further comprises at least one pressurizable seal.

* * * * *